United States Patent Office 3,515,343
Patented June 2, 1970

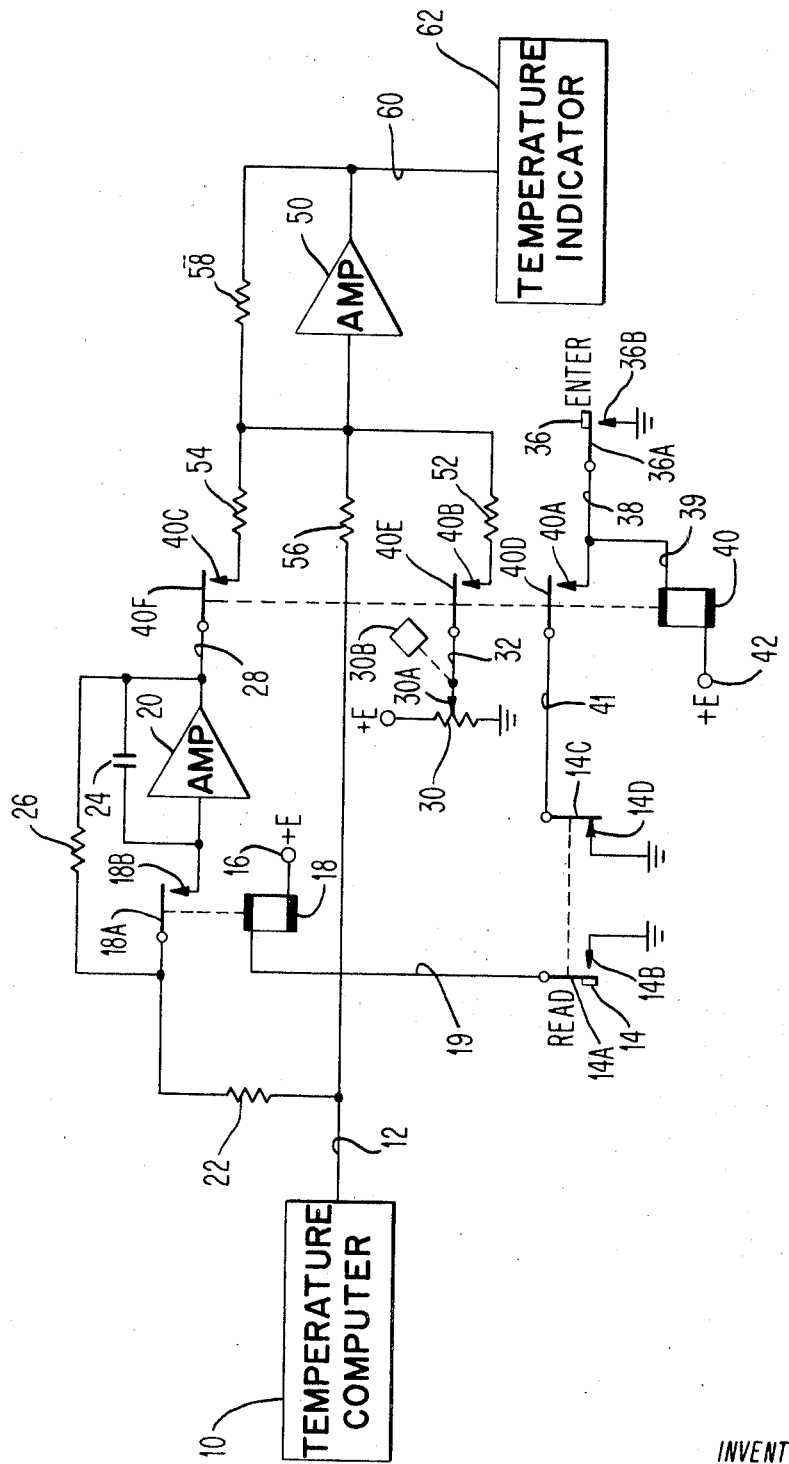

3,515,343
CORRECTION ENTRY CIRCUIT
John W. Schwartzenberg, Maple Glen, Pa., and Bernard Blum, Kenmore, N.Y., assignors to Leeds & Northrup Company, Philadelphia, Pa., a corporation of Pennsylvania
Filed Mar. 14, 1966, Ser. No. 534,042
Int. Cl. G05b 1/00; G05d 23/00
U.S. Cl. 235—151.3                                    8 Claims

ABSTRACT OF THE DISCLOSURE

Correcting a continuous measurement of a process variable in accordance with a more accurate sample measurement made by another independent test procedure is accomplished by storing the value of the process variable as measured at that time the sample is taken and comparing that stored value with the accurate sample measurement to obtain a correction value. The correction value is added to the continuous measurement to reduce its error.

---

This invention relates to circuits for correcting indications of process variables from test values determined independently and more particularly to circuits for correcting an indication of the value of a process variable at a time subsequent to the time when the test was made.

In a number of processes, the variables which must be determined are not easily measured directly and indirect measurements are therefore required. In some cases, an indirect measurement must be such that it will not be of adequate accuracy thereby requiring periodic correction in order that the indication of the value of that process variable can be useful for control of the process.

Examples of the type of process in which direct measurement of process variables are difficult include the basic oxygen furnace process for the refining of steel. In that process the measurement of the temperature of the bath in the furnace and the measurement of the amount of carbon in the bath and the amount of slag on the bath of the furnace are variables of the process which are best determined by indirect means. These indirect means include computations from measurements made of other related process variables. For example, the temperature computation may be determined by computing a heat balance for the process much in the manner disclosed in our co-pending U.S. application, Ser. No. 444,014, now U.S. Pat. 3,441,725.

Normally, in the basic oxygen process, for example, the temperature computer continually computes the temperature of the bath from the heat balance calculation and this computation is periodically corrected by turning down the vessel and making a temperature measurement with an immersion thermocouple or by using a "throw-in" thermocouple to get an accurate temperature reading. When such a test is made, it is usually necessary for the operator to record the computed value of the temperature at the time the test is made so that once the test has been evaluated and the test reading obtained, the recorded value may be subtracted from the test reading. The difference represents the required correction and may then be applied to the indicator circuit to correct the temperature being computed by the temperature computer.

It is an object of this invention to provide a circuit for effecting at a certain time a correction of the indication of a process variable based on the evaluation of a test to determined the correct value for that variable at a previous time without the necessity of recording the indicated value when the test was made.

In carrying out the above object, the present invention in one form utilizes a means for effectively connecting the continuous signal which represents the computed value of the process variable to a storage means so that a signal representing the instantaneous value of the process variable at that particular time, namely the time when the test is to be made, can be stored. Also the invention utilizes a means for establishing a signal representative of the correct value of the process variable as established by an evaluation of the test. There is also provided a means for modifying the continuous signal which is being indicated in accordance with the difference between the correct value as obtained from the test and the stored value of the process variable. The adding of this difference to the continuous signal corrects the indication.

For a more detailed understanding of the invention and for an illustration of a preferred form thereof, reference is made to the drawing which is a diagrammatic showing of an analog circuit for carrying out the object of this invention.

In the figure, the temperature computer 10, shown here in block form, may be any one of a number of computation circuits such as that shown in FIG. 1 of U.S. Pat. 3,441,725 for obtaining from various process variables, the necessary information for a computation to establish indirectly on the output line 12 a signal indicative of the temperature as computed by the circuit of computer 10. Thus the signal on line 12 continuously represents the computed value for the temperature of the particular process involved.

When a test is to be made in the process by other and independent means to determine the correct temperature, it is necessary for the operator of the process to push the manually operated "read" button 14 to connect the contact 14A to contact 14B which is in turn connected to ground. This connection of contacts 14A and 14B causes current to flow from the source +E connected to terminal 16 through relay 18 and line 19 and through the contacts 14A and 14B to ground so as to energize relay 18 to pull in its movable contact 18A into contact with its stationary contact 18B.

At the same time that contacts 14A and 14B are brought into contact by the actuation of the "read" button 14 by the operator, there is also a disconnection of contacts 14C and 14D whose function will be described subsequently.

Upon the energization of relay 18, the integrating operational amplifier 20 is connected in circuit with output line 12 by way of input resistor 22. The operational amplifier 20 includes a capacitor 24 across its input and output terminals and when contact 18A is in contact with contact 18B resistor 26 is also placed across the input and output terminals of amplifier 20. As shown in the sole figure, the resistors 22 and 26 are serially connected to the output of amplifier 20 when relay contacts 18A and 18B are out of contact.

Upon the energization of relay 18 to connect amplifier 20 to output line 12 from temperature computer 10, there is effected a storage of instantaneous values of the signal existing on output line 12 in amplifier 20 by the charging of its capacitors 24 so as to produce on line 28 which is the output line of the amplifier 20 a signal of opposite polarity to that appearing on line 12 but of a magnitude equal to that existing at the time that the "read" button 14 was actuated. Normally, the "read" button 14 need only be held in for a very short period of time sufficient to allow the capacitor 24 to be charged and then the button is released by the operator so that relay 18 can be de-energized and the integrating amplifier 20 is disconnected by the breaking of contacts 18A and 18B.

The result of pressing of the "read" button by the operator has thus been to store in the integrating circuit represented by amplifier 20 a signal representing the instantaneous value computed for the temperature at the particular time that the test was being made to determine the correct temperature.

After the test to determine the correct temperature has been evaluated as by reading the temperature indications on a separate independent test apparatus, it is then necessary to enter the correct temperature value by adjusting the variable tap 30A on potentiometer slidewire 30 for the adjustment of knob 30B. The potentiometer slidewire 30 is connected at its upper end to a potential source E, which must of necessity be of a fixed or regulated value. The lower end of slidewire 30 is connected to ground so that by the adjustment of variable contact 30A there is obtained on line 32 a potential representative of the correct temperature as obtained from the evaluation of the test.

Once the operator has by the adjustment of knob 30B entered the correct temperature reading, the operator may then press the "enter" button 36 to connect the movable contact 36A with stationary contact 36B. The contact 36B is connected to ground as shown in the figure and the variable or movable contact 36A is connected by line 38 to stationary contact 40A as well as to line 39.

When the operator presses the "enter" button 36, relay 40 is energized by the current flow from source +E, connected at terminal 42 to the relay 40, the other connection to relay 40 being by way of line 39 through contacts 36A and 36B to ground.

Upon energization of relay 40, the movable contacts 40D, 40E and 40F are respectively brought into contact with their associated stationary contacts 40A, 40B and 40C. Since the contacts 14C and 14D will be in contact at the time that the "enter" button 36 is actuated, there will be a ground connection through these contacts as well as contracts 40D and 40A and line 39 to relay 40 so as to hold relay 40 in an energized state even after the "enter" button 36 had been released.

Upon the energization of relay 40 to bring into contact the movable contacts 40E and 40B as well as the contacts 40F and 40C, the potential representing the correct temperature values is introduced into the summing amplifier 50 node at the junction of input resistors 52, 54 and 56 with the input to high gain amplifier 50 and feedback resistor 58 by way of input resistor 52 and the stored temperature value has represented by the potential on line 28 is introduced into the summing node by way of input resistor 54. The polarity of the potential on line 28 will be opposite that on line 32 so that the effect of the summation is to subtract the stored temperature value represented by the potential on line 28 and the correct temperature value represented by the potential on line 32. This difference is added to the existing computed temperature by virtue of the fact that the signal on line 12 is introduced as another input to the summing node by way of input resistor 56. High gain amplifier 50 in conjunction with resistors 52, 54, 56 and 58 forms a summing amplifier of the operational type so that amplifier 50 in conjunction with resistors 52, 54, 56 and 58 forms an operational amplifier 50.

The output of amplifier 50 appears on line 60 which provides an input to temperature indicator 62 which in turn serves to provide a continuous indication of the temperature being computed and upon the entry of the corrected value will show a correct temperature reading.

As previously mentioned, the circuit of the figure may be utilized to correct the indication of other process variables which may be either measured or computed by means which require correction as a result of the evaluation of independent tests made to determine the correct value of the particular variable being indicated.

If desired, means may be provided for breaking the hold-in circuit for relay 40. Such means for example include a switch (not shown) in line 41. That switch could be used to open the circuit holding relay 40 in the energized position so as to reset the circuit for the next test period.

What is claimed is:
1. A circuit for correcting a signal continuously representative of the value of a process variable in accordance with the evaluation of a test made at an earlier time during the process comprising
    storage means,
    means for selectively connecting said continuous signal to said storage means at the time when said test is made so that a signal representing the instantaneous value of said process variable at the time of said test is stored,
    means for producing from the evaluation of said test a signal representative of the correct value for said process variable at the time of said test, and
    means for modifying said continuous signal at a later time in response to the difference between said stored signal and the signal representative of said correct value.
2. A circuit for providing a corrected indication of the value of a process variable comprising
    means for producing a first signal continuously representative of the value of the process variable, as determined by one means,
    storage means selectively connected to receive and store as a second signal the value of said first signal at a time when an independent test of the value of said process variable by another means is being made,
    means for establishing a third signal of magnitude representing the correct value of said variable as determined from said test, and
    means for selectively combining said first, second and third signals to provide a fourth signal operable to actuate an indicating means, said combining means including means operable to establish said fourth signal to be representative of the difference between said second and third signals plus said first signal.
3. A circuit as set forth in claim 2 in which said means for producing said first signal is a computing circuit responsive to process conditions so as to compute the process variable to be indicated.
4. A circuit as set forth in claim 2 in which said means for establishing said third signal includes a potentiometer supplied by a constant source of potential.
5. A circuit as set forth in claim 2 in which said combining means includes a summing amplifier coupled to combine said first, second and third signals so as to produce said fourth signal as an output.
6. A circuit for providing a correctable indication of the value of a process variable comprising
    a computing circuit responsive to process conditions so as to produce a first signal representing the computed value of the process variable to be indicated,
    an integrating type operational amplifier selectively connected to receive said first signal at a particular time when a test is to be made of said process variable and operable to produce a second signal representing the stored value of said first signal,
    a source of potential adjustable in accordance with the correct magnitude of said process variable as determined by said test, and
    a summing amplifier connected to receive at a selected time said first, second and third signals and operable to sum said first signal with the difference between said second and third signals to establish as an output a fourth signal representing said sum, said fourth signal being indicative of a corrected value of said process variable.
7. A circuit for providing a corrected indication of a value of a process variable comprising
    means for producing a first signal continuously representative of the value of the process variable as determined by one means,
    storage means including an integrating type operational amplifier connected to receive and operable to store in its feedback capacitor as a second signal a charge related to the value of said first signal at the time when an independent test of the value of said process variable by another means is being made, means for establishing a third signal of magnitude representing the correct value of said variable as determined from said test, and means for selectively combining said first, second, and third signals to provide a fourth signal operable to actuate an indicating means, said combining means including means operable to establish said fourth signal to be representative of the difference between said second and said third signals plus said first signal.

8. The method for correcting a signal continuously representative of the value of a process variable in accordance with the evaluation of a test made at an earlier time during the process comprising the steps of selectively storing a signal representing the instantaneous value of the process variable at the time when said test is made, producing in accordance with the evaluation of said test a signal representative of the correct value for said process variable at the time of said test, and modifying said continuous signal at a later time in response to the difference between said stored signal and the signal representative of said correct value.

References Cited

UNITED STATES PATENTS

| | | | |
|---|---|---|---|
| 2,919,401 | 12/1959 | Cole et al. | 324—74 |
| 3,242,489 | 3/1966 | Leyde | 328—185 XR |
| 3,243,699 | 3/1966 | Kummer | 324—130 XR |
| 3,359,410 | 12/1967 | Frisby et al. | 235—183 |
| 3,392,914 | 7/1968 | Nieustaedt | 235—151.13 XR |
| 2,905,879 | 9/1959 | Starr | 320—1 |
| 3,176,518 | 4/1965 | Morris et al. | 73—503 |
| 3,280,312 | 10/1966 | Sandelien | 235—151.3 |

MALCOLM A. MORRISON, Primary Examiner

E. J. WISE, Assistant Examiner

U.S. Cl. X.R.

324—71; 328—151; 235—183